United States Patent [19]

Graham et al.

[11] Patent Number: 5,351,786
[45] Date of Patent: Oct. 4, 1994

[54] HIGH TEMPERATURE LUBRICATION FOR METAL AND CERAMIC BEARINGS

[75] Inventors: Edgar E. Graham, Lyndhurst; Nelson H. Forster, Dayton, both of Ohio

[73] Assignee: Cleveland State University, Cleveland, Ohio

[21] Appl. No.: 937,425

[22] Filed: Aug. 31, 1992

[51] Int. Cl.⁵ ............................................. F01M 5/00
[52] U.S. Cl. ................................. 184/6.22; 184/6.26; 184/6.21; 184/55.1; 384/463; 427/255.6; 118/715
[58] Field of Search ............... 184/104.1, 6.26, 6.21, 184/6.22, 109, 55.1; 384/463; 427/255, 255.6; 118/715

[56] References Cited

U.S. PATENT DOCUMENTS

| | | | |
|---|---|---|---|
| 2,841,244 | 7/1958 | Sorem | 184/109 |
| 2,994,408 | 8/1961 | Sorem | 184/109 |
| 3,423,929 | 1/1969 | Matthews | 92/154 |
| 4,264,642 | 4/1981 | Ferralli | 427/255.6 |
| 5,015,405 | 5/1991 | Kar et al. | 252/49.9 |
| 5,061,388 | 10/1991 | Nader | 200/47 |
| 5,118,431 | 6/1992 | Nader | 252/46.4 |
| 5,124,058 | 6/1992 | Corti et al. | 252/54 |
| 5,163,757 | 11/1992 | Graham | 384/463 |

FOREIGN PATENT DOCUMENTS

| | | | |
|---|---|---|---|
| 001042 | 4/1981 | PCT Int'l Appl. | 184/104.1 |
| 2203758 | 10/1988 | United Kingdom | 427/255.6 |

Primary Examiner—Thomas E. Denion
Attorney, Agent, or Firm—John F. McDevitt

[57] ABSTRACT

Metal and ceramic bearing means being operated at elevated temperatures of at least 300° C. and higher under atmospheric conditions are effectively lubricated with a novel class of vapor-phase deposited polymer lubricants. The lubricants are formed in situ during bearing operation and can further be applied as a pre-coat upon at least one of the untreated bearing surfaces for subsequent operation in the same manner.

24 Claims, 3 Drawing Sheets

BEARING TESTER

BEARING TESTER

HIGH TEMPERATURE LUBRICATION FOR METAL AND CERAMIC BEARINGS

This invention was made with Government support under contract F33615-90-C-2086 with the Department of the Air Force. The Government has certain rights in the invention.

BACKGROUND OF THE INVENTION

This invention relates generally to lubrication means enabling both metal and/or ceramic bearing surfaces to resist mechanical wear at elevated temperatures of at least 300° C. and higher, and more particularly to employing an improved source of lubrication as the means for doing so.

Lubrication is a well recognized means to reduce friction and wear between bearing surfaces in dynamic physical contact. As such, a pair of load bearing surfaces having relative movement therebetween will be in rolling or sliding contact, as well as combinations thereof, which can include a wide variety of known structural articles such as journal bearings, piston rings, gears, cams and the like. Two major areas for which improved lubricants are needed for continued progress are metal-forming and transportation. Better metal-forming capabilities to minimize machining and grinding require lubrication techniques and lubricants that can be used effectively at temperatures approaching the melting points of the metals now employed. In transportation, one of the most productive areas for increasing energy efficiencies is often referred to as high temperature engines wherein temperatures range from 300° C. and above making the selection of lubricants and means of lubrication difficult. In other known bearing applications, high bearing contact pressures of 70,000 psi are experienced making lubrication most difficult with existing lubricant systems. A known technique for lubrication at such high bearing temperatures and pressures is the use of solid lubricants in the form of plasma sprayed coatings of metals and ceramics being employed. More recent developments whereby an adherent solid polymeric lubricating film is deposited on a ferrous metal surface to afford such protection are reported in technical publications entitled "In situ Formation of Solid Lubricating Films from Conventional Mineral Oil and Ester Solid Lubricants" authored by N. deGouvea Pinto, J. L. Duda, E. E. Graham and E. E. Klaus, ASLE Proceedings, 3rd International Conference on Solid Lubrication, ASLESP-14, 1984 and "Lubrication from the Vapor-Phase at High Temperatures", authored by E. E. Graham and E. E. Klaus, ASLE Transactions, Volume 29 No. 2, pages 229–234 (1986). As described in the said technical publications the metal surfaces are deemed to have a catalytic effect upon the vapor-phase reactants whereby surface polymerization of said reactants takes place to produce the protective film. Possibly the absence of comparable metal catalytic agents in ceramic materials has prevented the formation of the protective film in such manner. More particularly, a vapor-phase deposition of the same reactants under the same process conditions have thus far only produced non-adherent surface deposits affording no substantial protection to the underlying ceramic substrate.

Improved vapor-phase lubrication of ceramic bearing devices with a more adherent organic polymer film is disclosed in a co-pending U.S. patent application Ser. No. 07/488,984 entitled "Ceramic Article Having Wear Resistant Coating", filed Mar. 5, 1990 in the names of E. E. Graham and J. F. Makki, and now U.S. Pat. No. 5,139,876. Formation of a tenacious lubricating film is achieved upon treating the uncoated ceramic surface at elevated temperatures with activating metal ions to form a deposit of the activating metal ions on the ceramic surface and thereafter exposing the treated ceramic surface to a vaporized polymer-forming organic recactent at elevated temperatures whereby an adherent solid organic polymer lubricating film is produced on the treated surface. Bearing surfaces formed with crystalline ceramic materials such as silicon nitride and silicon carbide as well as vitreous ceramics such as fused quartz can be provided with a protective coating resistant to dynamic wear conditions up to at least 500° C. and higher in this manner. In one embodiment, activating metal ions comprising a transition metal element selected from the Periodic Table of Elements, to include iron and tin are initially deposited at temperatures of at least 300° C. on the ceramic surface. Formation of a lubricating film on the treated ceramic surface is achieved with vapor deposition again conducted at elevated temperatures of approximately 300° C.–800° C. of various polymer forming organic reactants such as petroleum hydrocarbon compounds, mineral oils, various synthetic lubricants and to further include tricresyl phosphate (TCP) and triphenyl phosphate.

In a still more recently filed U.S. patent application Ser. No. 07/739,402, entitled "Metal Oxide Lubrication for Ceramic Bearing System", filed Aug. 2, 1991, in the name of E. E. Graham, and now U.S. Pat. No. 5,162,757 there is disclosed lubrication means for ceramic bearing devices utilizing metal oxide lubricants formed during bearing operation. As therein disclosed, continuous lubrication of the ceramic bearing surface is provided with solid metal oxide lubricants formed in situ with an oxidizable metal source located in physical proximity to the ceramic bearing surfaces being treated. A representative lubrication system enabling such mode of operation includes (a) support means causing the ceramic bearing surfaces to be maintained in dynamic physical contact, (b) an oxidizable metal source located in physical proximity to the support means, and (c) heating means for continuously heating the metal source while the ceramic bearing surfaces are being operated sufficient to provide the solid metal oxide lubricants. In one embodiment, the ceramic bearing means employs ceramic ball bearings supported within a ceramic race with a metal housing member enclosing the bearing structure. Utilizing oxidizable metals for construction of said housing member, including molybdenum and iron alloys, provides a suitable metal source in sufficient physical proximity to the bearing surfaces for satisfactory lubrication at the aforementioned operating conditions.

It remains desirable to provide lubrication of both metal and ceramic bearing means when operated at these elevated temperatures under atmospheric conditions by still more effective means. Accordingly, it is one object of the present invention to provide improved lubrication means for various type mechanical apparatus utilizing either metal or ceramic bearing materials, including combinations thereof, under such operating conditions.

It is another object of the present invention to provide means for continuous lubrication of metal and ceramic bearing surfaces with novel polymer lubricants formed in situ.

A still further object of the present invention is to provide a novel method for the lubrication of metal and/or ceramic bearing surfaces at relatively low lubricant levels with vapor-phase deposited lubricants.

These and further objects of the present invention will become apparent upon considering the following detailed description of the present invention.

SUMMARY OF THE INVENTION

It has now been discovered, surprisingly, that a more effective lubrication means can be provided for a mechanical apparatus employing at least one pair of moving bearing surfaces being operated in dynamic physical contact to resist mechanical wear of said bearing surfaces at elevated bearing operating temperatures of at least 300° C. More particularly, both reduction of the friction coefficient and reduction of surface wear is now provided with a novel class of polymer lubricants vapor-deposited during atmospheric bearing operation at such elevated temperatures. Both metal and ceramic bearing means can be operated in this manner with little wear occurring over relatively lengthy time periods while such lubricants are being continuously applied. Application of the present lubricants as a vapor deposited precoat upon at least one of the bearing surfaces has also been found useful. Generally, the presently improved bearing lubrication requires (a) treating the bearing surfaces during operation with a vaporizable phosphazene compound in the vapor-phase at elevated temperatures of at least 300° C., and (b) polymerizing the vaporized phosphazene compound while in contact with the operating bearing surfaces to form an adherent polymer lubricating coating on at least one of the treated bearing surfaces. A typical mechanical apparatus employing the present lubrication means to resist wear occurring between a pair of moving bearing surfaces being operated in dynamic physical contact requires (a) support means causing the bearing surfaces to be maintained in dynamic contact, (b) a source of vaporizable phosphazene compound, and (c) heating means to vaporize the phosphazene compound causing the vaporized phosphazene compound to polymerize and form an adherent polymer lubricating coating on at least one of the bearing surfaces while being operated in dynamic physical contact at elevated temperatures of at least 300° C. During such operation of the illustrated apparatus, the phosphazene compound becomes initially vaporized then polymerized in the vapor-phase for subsequent deposition of the polymer product in lubricating amounts on at least one of the moving bearing surfaces. For optional pretreatment of a bearing member to apply the present lubricant prior to operation in the forgoing manner, the phosphazene compound can again be vaporized at elevated temperatures of at least 300° C. to derive an adherent solid coating on the untreated bearing surface when examined at ambient conditions.

Suitable lubricant precursor materials for employment in accordance with the present invention can be selected from the class of vaporizable phosphazene compounds which polymerize in the vapor-phase to form a tenacious coating on the untreated bearing surface when heated to temperatures of at least 300° C. Since formation of the desired phosphazene polymer coatings in such manner on a ceramic bearing member can also possibly be enhanced in accordance with means described in the previously identified copending Ser. No. 07/488,984 and Ser. No. 07/739,4.02 applications, the entire contents of both mentioned applications are hereby specifically incorporated by reference into the present application. Representative phosphazene compounds exhibiting the desired behavior are already known and commercially available from the Dow Chemical Company as well as further identified in an article entitled "Development and Tribological Properties of New Cyclotriphosphazene High Temperature Lubricants for Aircraft Gas Turbine Engines", Volume 35 (1992), pages 37–44 of the Tribology Transactions under the authorship of B. S. Nader, Kishore K. Kar, T. A. Morgan, C. E. Pawloski and W. L. Dilling. As therein described, the suitable phosphazene compounds include linear phosphazene, cyclophosphazene and cyclotetraphosphazene, including mixtures thereof, with a preferred commercial product being designated X-1P as containing bis(4-fluorophenoxy)-tetrabis(3-trifluoromethylphenoxy) cyclotriphosphazene. Conventional polymerization of such phosphazene compounds to provide preformed polymer lubricants are also disclosed in U.S. Pat. Nos. 4,613,548; 5,015,405; and 5,099,055.

DETAILED DESCRIPTION OF THE PREFERRED EMBODIMENTS

Figure 1:
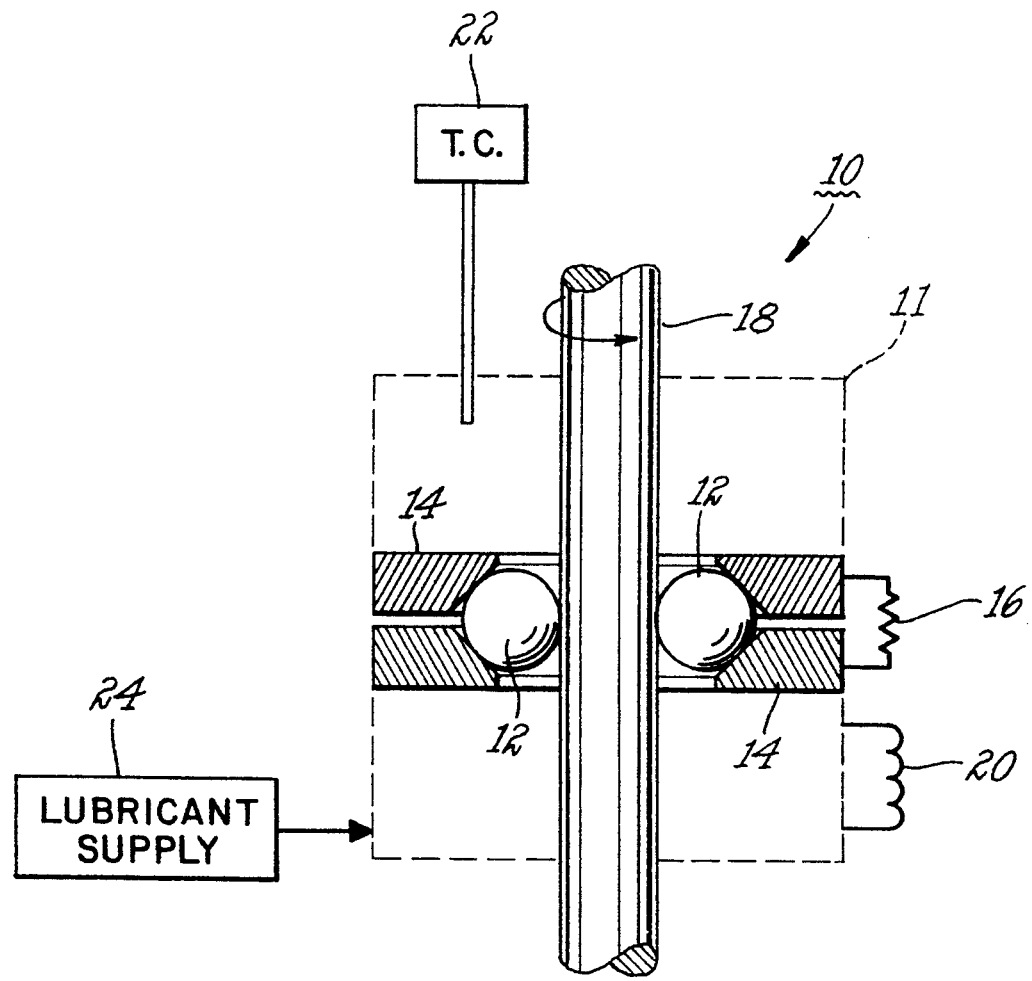
FIG. 1 is a cross sectional view depicting a test apparatus having a representative ball and rod type bearing construction for operation in accordance with the present invention.

Referring to the drawings, there is depicted in FIG. 1 a mechanical test apparatus 10 employing metal or ceramic bearing means being operated according to the present invention. More particularly, the depicted test apparatus is of the known ball and rod fatigue tester modified for high temperature operation. Candidate bearing materials including ceramics such as silicon nitride and silicon carbide as well as metals such as TZM molybdenum alloys, M50 molybdenum alloy, 4340 steel alloy, and 70% iron/15% molybdenum/15% cobalt powdered metal alloy are evaluated within a housing or cage member 11 to determine mechanical wear under various test conditions. An assembled bearing construction contained within said enclosure is employed for evaluation having a plurality of ball members 12 formed with the candidate bearing materials being physically supported on a tapered race track 14. Spring force means 16 applied to said race track provide further physical contact to ball members 12 with a central rod bearing member 18 located within the enclosure and also formed with a candidate bearing material being evaluated. An electric motor (not shown) rotates said rod member at speeds reaching or exceeding 3200 RPM during the evaluation with housing member 11 also being heated by conventional induction heating means 20. Test temperatures during such evaluation are measured by thermocouple means 22 while load is being applied with the provided spring force to produce dynamic physical contact between the ball and rod bearing surfaces being evaluated. An air mixture containing the lubricant is provided to housing member 11 from a conventional supply source 24 with its introduction being below the bearing contact region. Operation of the illustrated bearing means under the aforementioned test conditions provides a sufficient heat source for visible observation of a tenacious polymer deposit being formed on the ball and rod members with the present lubrication means.

Figure 2:
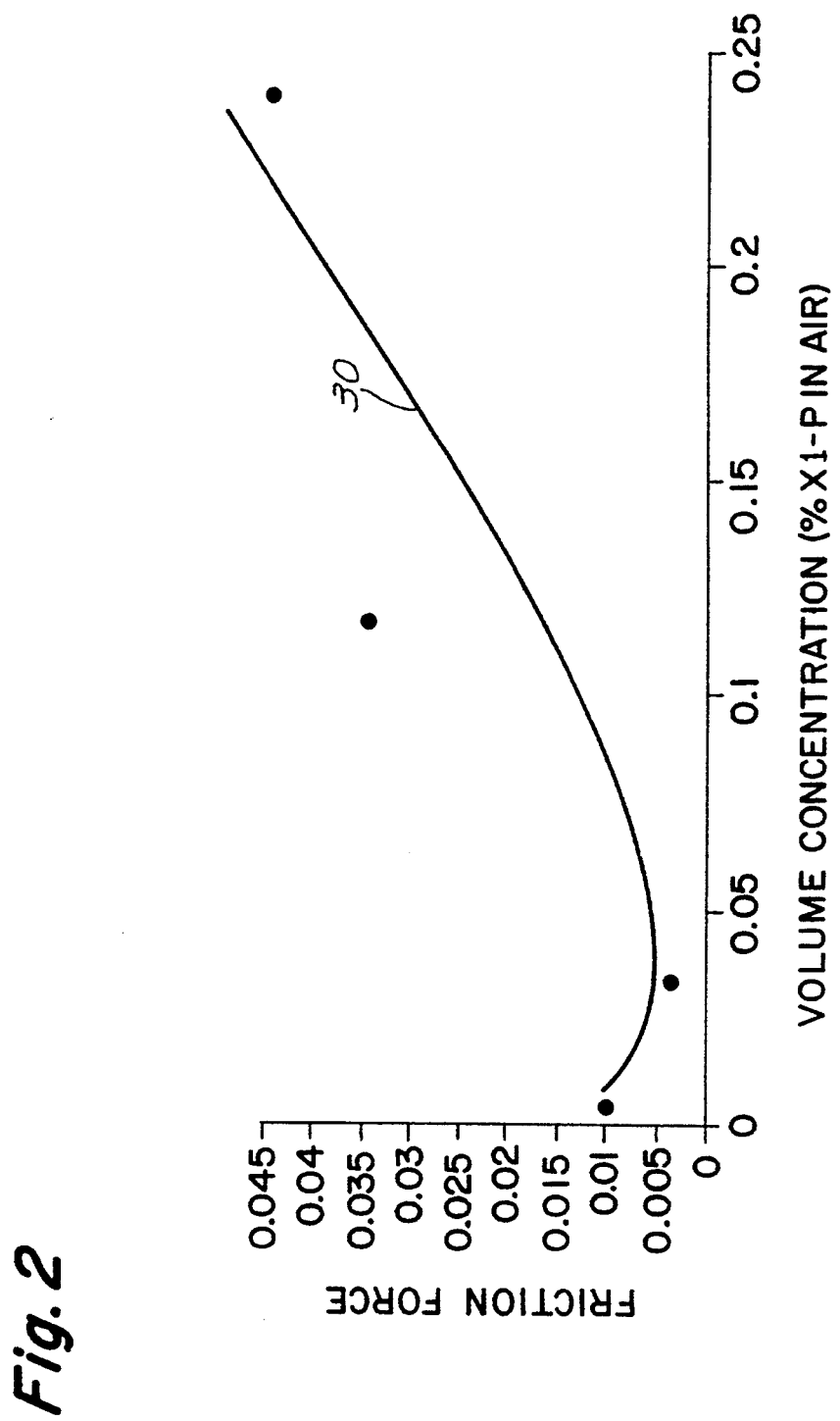
FIG. 2 is a graph providing friction force measurements for a particular lubrication means of the present invention.

Friction force measurements are reported in FIG. 2 for bearing operation in the above described apparatus at 670° F. with M50 molybdenum steel ball and rod members being enclosed within a housing member 11 formed with a 70% iron/15% molybdenum/15% cobalt powdered metal alloy purchased from the Clevite Corporation. The friction force measurements listed on the graph ordinate were found to have numerical values approximately equal to conventional friction coefficient values for the particular measurements means being employed. Accordingly, said graph depicts friction coefficient variation when the concentration of the previously identified X-1P lubricant is varied and with the lubricant concentration values being reported on the graph abscissa in terms of volume percent for the applied air mixture. As can be noted in the reported results, friction coefficients 30 were found to surprisingly decrease with a reduction in the amount of lubricant being employed until a relatively low 0.04 lubricant concentration level was reached. It will be apparent from these measurements that a broad commercial potential exists for the present lubrication means. The resulting solid polymer lubricants produced in such manner were also found to have molecular weights of at least 30,000.

Still further evaluations were conducted for the particular type lubrication means identified in the preceding FIG. 2 embodiment. Specifically, various bearing candidate materials identified in the Table below were tested with the same phosphazene lubricant at various lubricant flow rates and lubricant concentrations so that conventional surface roughness and wear volume measurements could be made. The time duration of these test runs are further included in said Table along with reporting the temperature at which bearing operation was conducted. In test run #1, the reported metal bearing construction was initially operated in air from a cold start at ambient temperature with lubricant being continuously supplied as operating temperature was increased within the housing member 11 to the reported final temperature of operation. Test run #2 provided a longer test period for the same bearing structure with the reported bearing experiencing two cold starts during operation at the further reported conditions. Test run #3 employed a single cold start again for the same metal bearing structure while being conducted with varied lubricant concentrations reported in said Table. Test runs #4–6 employed a composite bearing construction having both metal and ceramic bearing members formed with the same material composition. In test run #4, the bearing surfaces of the ceramic bearing members were precoated with the same vapor deposited polymer lubricant being employed during test evaluation. It will be apparent from these measurements that all employed metal and ceramic bearing structures experienced only slight surface roughness and wear during lengthy time durations at temperatures even up to 500° C. and higher.

TABLE

|  | Run # | | | | | |
| --- | --- | --- | --- | --- | --- | --- |
|  | 1 | 2 | 3 | 4 | 5 | 6 |
| Bearing Materials |  |  |  |  |  |  |
| Rod | M50 | M50 | M50 | $Si_3N_4$ | $Si_3N_4$ | $Si_3N_4$ |
| Balls | M50 | M50 | M50 | $Si_3N_4$ | $Si_3N_4$ | $Si_3N_4$ |
| Race | M50 | M50 | M50 | $Si_3N_4$ | $Si_3N_4$ | $Si_3N_4$ |
| Cage | 4340 | 4340 | 4340 | Clevite* | Clevite* | Clevite* |
| Temp (F.) | 670 | 670 | 670 | 1000 | 1000 | 1000 |
| Flow Rate (ml/hr) | 0.81 | 0.81 | 2.5 to 0.16 | 1.2 | 2.5 to 0.16 | 0.16 |
| Conc. % in air | 0.023 | 0.023 | 0.007 to 0.0046 | 0.034 | 0.07 to 0.003 | 0.0046 |
| Test Duration (hrs.) | 5.0 | 20.0 | 6.1 | 5.0 | 10.0 | 50.0 |
| Surface Roughness ($\mu$m) | 0.08 | 0.33 | 0.11 | 0.13 | 0.37 | 0.30 |
| Wear Volume $X - 10^{-9}$ (mm/ stress cycle) | 2.53 | 2.77 | 4.61 | 5.78 | 31.8 | 3.09 |

*70% Fe powdered Alloy/15% Mo/15% Co

Figure 3:
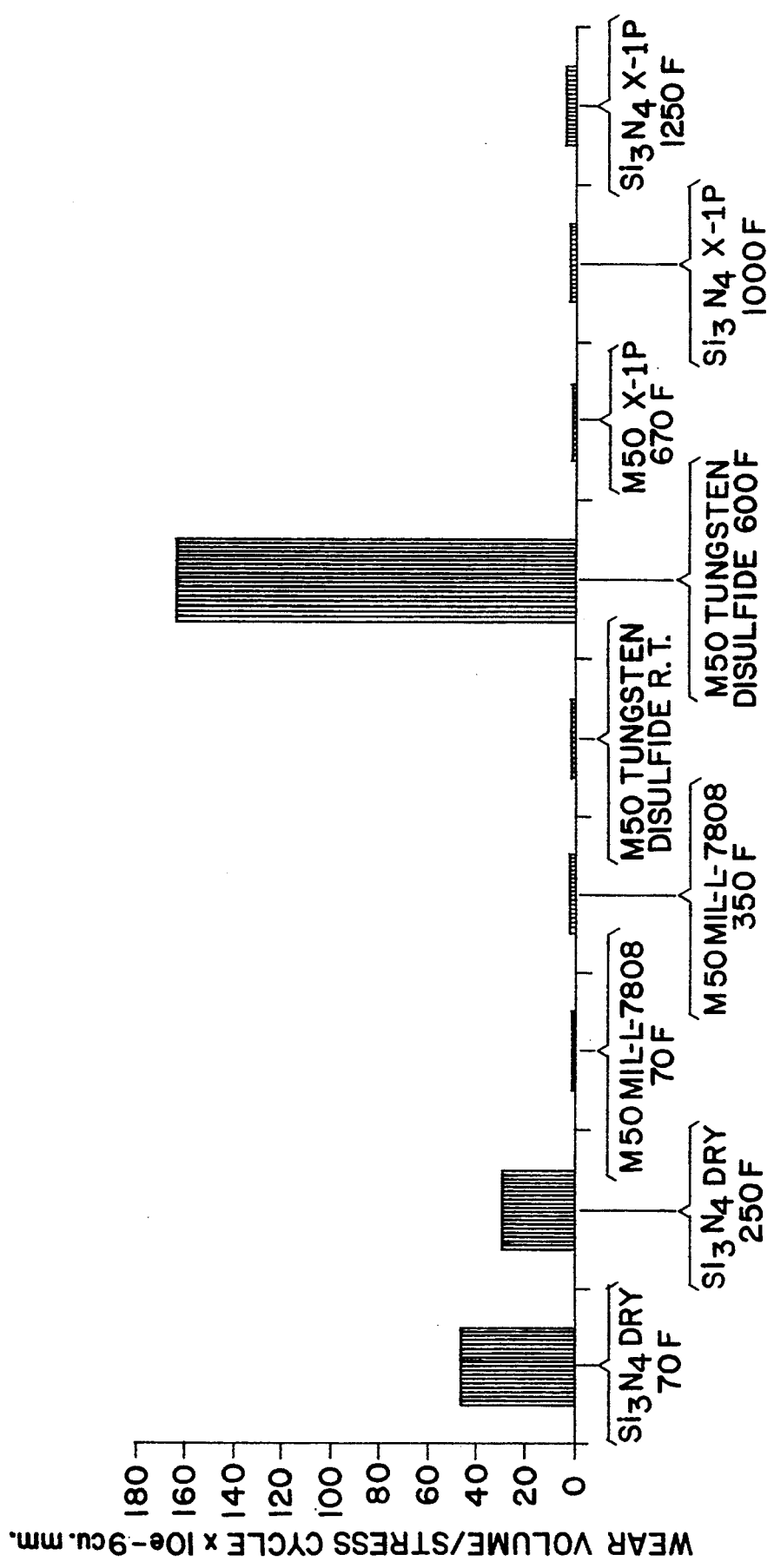
FIG. 3 is a graph enabling a comparison to he made of the bearing wear characteristics for the same lubrication means of the present invention identified in preceding FIG. 2.

In FIG. 3, a bar graph is shown reporting a comparison made of wear volume for the particular bearing structures identified in FIG. 2 when operated with various lubrication means. The same test apparatus employed therein was also utilized for the present comparison between various prior art lubricants and the present lubrication means. The graph abscissa provides temperature of operation for the reported bearing structures with "RT" signifying room temperature operation. Bearing operation without lubrication is also reported on the graph abscissa as "DRY" to provide a still further indication of bearing wear occurring without assistance of the reported lubricants. The reported "MIL-L-7808" lubricant is a commercially available polyol ester liquid whereas further reported "TUNGSTEN DISULFIDE" is another commercially available solid lubricant now being used for bearing lubrication at very elevated temperatures. Wear volume measurements are reported on the graph ordinate for the reported test conditions. It will be apparent from these wear volume measurements that the illustrated X-1P lubricant therein employed according to the present invention affords greater resistance to bearing wear at elevated temperatures up to 500° C. and higher than now can be provided with the evaluated prior art lubricants. Upon further considering the comparison made with conventional lubricants in FIG. 3 in conjunction with the very low friction coefficient values reported in FIG. 2 at relatively low concentration levels of the present lubricants, it seems evident that only the present lubrication means furnish both low friction coefficients and low wear characteristics during elevated temperature operation.

It will be apparent from the foregoing description that broadly useful and novel means have been provided to continuously lubricate various type metal and/or ceramic bearing surfaces when operated under various atmospheric conditions at extremely elevated temperatures of at least 300° C. and higher. It is contemplated that such improved lubrication can likewise be obtained with a broad range of load bearing constructions in rolling and/or sliding contact other than above illustrated, however, to include both ball and roller bearing devices, as well as apparatus employing gears, cams, piston rings and like devices. Likewise, it is contemplated that enhancement of resistance to bearing surface wear provided with the present lubrication means can possibly be further improved utilizing additional means for treatment of the bearing surfaces such as disclosed in the aforementioned copending patent applications. Substituting still other metal and ceramic materials than herein described for construction of the various bearing articles could also desirably lower lubricant levels for the present lubrication means while possibly further decreasing bearing surface wear at these elevated temperatures. Phosphazene polymers providing lubrication in the presently disclosed manner may possibly further exist in both solid and liquid states at the elevated temperatures of bearing surface operation herein being employed. Consequently, it is intended to limit the present invention only by the scope of the appended claims.

What we claim as new and desire to secure by Letters Patent of the United States is:

1. Improved lubrication means for a mechanical apparatus employing at least one pair of moving bearing surfaces constructed with a material selected from the group consisting of metals and ceramics, said bearing surfaces being operated in dynamic physical contact to resist mechanical wear of said bearing surfaces at elevated bearing operating temperatures of at least 300° C. comprising:
   (a) treating the bearing surfaces during operation with a vaporizable and polymerizable phosphazene compound in the vapor phase at elevated temperatures of at least 300° C., and
   (b) polymerizing the vaporized phosphazene compound while in contact with the operating bearing surfaces to form an adherent solid polymer lubricating coating with a molecular weight of at least 30,000 on at least one of the treated bearing surfaces.

2. The lubrication means of claim 1 wherein the employed phosphazene compound is a cyclophosphazene.

3. The lubrication means of claim 2 wherein the employed phosphazene compound is an aryloxycyclotriphosphazene.

4. The lubrication means of claim 3 wherein the employed phosphazene compound is bis(4-fluorophenoxy)-tetrabis(3-trifluoromethylphenoxy) cyclotriphosphazene.

5. The lubrication means of claim 1 wherein the bearing surfaces being treated are constructed with a metal material.

6. The lubrication means of claim 1 wherein the bearing surfaces being treated are constructed with a ceramic material.

7. The lubrication means of claim 1 wherein the solid polymer coating is formed on at least one of the untreated bearing surfaces prior to said bearing surfaces being operated in dynamic physical contact.

8. The lubrication means of claim 1 wherein vaporized phosphazene is polymerized in an air mixture.

9. The lubrication means of claim 1 wherein both bearing surfaces being treated are constructed with a metal material.

10. The lubrication means of claim 1 wherein both bearing surfaces being treated are constructed with a ceramic material.

11. The lubrication means of claim 1 wherein an oxidizable metal source located in physical proximity to the bearing surfaces being treated promotes polymerization of the vaporized phosphazene compound.

12. The lubrication means of claim 1 wherein improved lubrication includes both reduction of the friction coefficient and reduction in surface wear of the treated bearing surfaces during operation.

13. A mechanical apparatus employing at least one pair of moving bearing surfaces constructed with a material selected from the group consisting of metals and ceramics, said bearing surfaces being operated in dynamic physical contact which includes improved lubrication means to resist mechanical wear of said bearing surfaces at elevated bearing operating temperatures of at least 300° C., said apparatus including:
   (a) support means causing the bearing surfaces to be maintained in dynamic physical contact,
   (b) a source of vaporizable and polymerizable phosphazene compound, and
   (c) heating means to vaporize the phosphazene compound causing the vaporized phosphazene compound to polymerize and form an adherent solid polymer lubricating coating with a molecular weight of at least 30,000 on at least one of the bearing surfaces while being operated in dynamic physical contact at elevated temperatures of at least 300° C.

14. The apparatus of claim 13 wherein the vaporized phosphazene is polymerized in an air mixture.

15. The apparatus of claim 13 which further includes an oxidizable metal source in physical proximity to the bearing surfaces being treated to promote polymerization of the vaporized phosphazene compound.

16. The apparatus of claim 13 wherein the employed phosphazene compound is a cyclophosphazene.

17. The apparatus of claim 16 wherein the employed phosphazene compound is an aryloxycyclotriphosphazene.

18. The apparatus of claim 17 wherein the employed phosphazene compound is bis(4-fluorophenoxy)-tetrabis(3-trifluoromethylphenoxy) cyclotriphosphazene.

19. The apparatus of claim 13 wherein both bearing surfaces being treated are constructed with a metal material.

20. The apparatus of claim 13 wherein both bearing surfaces being treated are constructed with a ceramic material.

21. A method of reducing mechanical wear between a pair of moving bearing surfaces constructed with a material selected from the group consisting of metals and ceramics, said bearing surfaces being operated in dynamic physical contact at elevated temperatures of at least 300° C. comprising:
 (a) proving a source of vaporizable and polymerizable phosphazene compound,
 (b) heating the phosphazene compound sufficiently to cause its vaporization, and
 (c) polymerizing the vaporized phosphazene compound while in contact with the operating bearing surfaces to form an adherent solid polymer lubricating coating with a molecular weight of at least 30,000 on at least one of the contacted bearing surfaces.

22. The method of claim 13 wherein the phosphazene compound is polymerized in an air mixture.

23. The method of claim 13 which further includes providing an oxidizable metal source in physical proximity to the bearing surfaces being operated to promote polymerization of the vaporized phosphazene compound.

24. The method of claim 13 wherein a solid lubricating coating is formed on at least one of the untreated bearing surfaces prior to said bearing surfaces being operated in dynamic physical contact.

* * * * *